United States Patent [19]
Kato et al.

[11] Patent Number: 5,904,159
[45] Date of Patent: May 18, 1999

[54] POLISHING SLURRIES AND A PROCESS FOR THE PRODUCTION THEREOF

[75] Inventors: Hiroshi Kato; Kazuhiko Hayashi; Hiroyuki Kohno, all of Tokuyama, Japan

[73] Assignee: Tokuyama Corporation, Tokuyama, Japan

[21] Appl. No.: 08/751,769

[22] Filed: Nov. 8, 1996

[30] Foreign Application Priority Data

Nov. 10, 1995 [JP] Japan ..................................... 7-293114

[51] Int. Cl.⁶ ....................................................... B08B 7/00
[52] U.S. Cl. .................................. 134/7; 134/1.3; 134/2; 51/308; 451/38
[58] Field of Search ................................ 51/308; 134/1.3, 134/2, 6, 7; 241/21, 24.1; 451/36, 37, 38, 40

[56] References Cited

U.S. PATENT DOCUMENTS

| | | |
|---|---|---|
| 5,246,624 | 9/1993 | Miller et al. . |
| 5,264,010 | 11/1993 | Brancaleoni et al. ..................... 51/308 |
| 5,527,423 | 6/1996 | Neville et al. ............................ 51/308 |
| 5,605,490 | 2/1997 | Laffey et al. ............................. 451/36 |
| 5,697,992 | 12/1997 | Ueda et al. ............................... 51/307 |

FOREIGN PATENT DOCUMENTS

| | | |
|---|---|---|
| 20350/82 | 4/1982 | Japan . |
| 60420/91 | 3/1991 | Japan . |
| 338/93 | 1/1993 | Japan . |
| 9322103 | 11/1993 | WIPO . |

OTHER PUBLICATIONS

New Ceramics No. 2, pp. 45–51 (partial English translation) (1995).

Journal of the Ceramic Society of Japan 101(6) 707–712 (1993). (a summary in English).

*Primary Examiner*—Jan Ludlow
*Attorney, Agent, or Firm*—Sherman and Shalloway

[57] ABSTRACT

A polishing slurry is formed of a silica-dispersed solution obtained by dispersing, in an aqueous solvent, a fumed silica having an average primary particle size of from 5 to 30 nm, the silica-dispersed solution exhibiting a light scattering index (n) of from 3 to 6 at a silica concentration of 1.5% by weight, and the fumed silica dispersed therein having an average secondary particle size of from 30 to 100 nm on the weight basis. The polishing slurry is produced by pulverizing, using a high-pressure homogenizer, a silica-dispersed solution obtained by dispersing a fumed silica in an aqueous solvent, so that the fumed silica possesses an average secondary particle size of from 30 to 100 nm on the weight basis. The polishing slurry is used for polishing semiconductor wafers and inter-layer dielectric in an IC process.

12 Claims, 1 Drawing Sheet

POLISHING SLURRIES AND A PROCESS FOR THE PRODUCTION THEREOF

BACKGROUND OF THE INVENTION

1. Technical Field

The present invention relates to a novel polishing slurry that can be favorably used for polishing semiconductor wafers as represented by silicon and for polishing an inter-layer dielectric in the IC fabrication process (hereinafter often referred to as CMP). More specifically, the invention relates to a polishing slurry comprising a silica-dispersed solution obtained by dispersing fumed silica particles in an aqueous solvent, featuring a high purity, excellent polishing performance and excellent preservation stability.

2. Background Art

A conventional polishing slurry comprising a silica-dispersed solution can be represented by the one which comprises colloidal silica obtained by using sodium silicate as a starting material. For example, New Ceramics No. 2, pp. 45–46, 1995 discloses a polishing slurry for silicon wafers comprising colloidal silica obtained from sodium silicate. The colloidal silica is synthesized in a liquid phase and is used in the form of a dispersion without being dried, exhibiting small average particle diameter, good dispersion and very good stability in a solution.

Generally, however, the colloidal silica has a low purity and could not be used as a polishing slurry for semiconductor wafers that require high purity or as a polishing slurry for the inter-layer dielectric in the IC process. In particular, the polishing slurry for the inter-layer dielectric causes a serious problem of contamination due to cations such as of heavy metals and, hence, must have a high purity.

To meet these requirements, the above literature proposes a method of obtaining colloidal silica by using an organo-silicon compound such as alkoxide as a starting material of colloidal silica.

However, the colloidal silica is produced on an industrial scale maintaining a poor yield. Besides, the method which uses the organosilicon compound involves a problem of an increase in the cost of production due to the starting material.

Moreover, the particles of the colloidal silica are soft and easily adhere strongly on the polished surfaces and cannot be removed to a sufficient degree even by the washing. This means that the polished surfaces are further contaminated when use is made of the colloidal silica containing much impurities, that is obtained by using the sodium silicate as a starting material.

In addition to the colloidal silica, there has been known a fumed silica which is a fine silica and is obtained on an industrial scale maintaining a good yield by burning a silicon tetrachloride in the hydrogen-oxygen combustion flame. The fumed silica has a primary particle size which is as small as that of the colloidal silica and has a high purity. Therefore, attempts have been made to use the fumed silica as a polishing slurry to substitute for the polishing slurry which uses the colloidal silica.

For example, Japanese Patent Publication No. 20350/1982 and Japanese Laid-Open Patent Publication No. 60420/1991 disclose a silicon-dispersed solution obtained by dispersing a fumed silica in an aqueous solvent and a polishing slurry for silicon wafers comprising the above silica-dispersed solution.

However, the fumed silica is provided in the form of a dry aggregated powder which, when it has a large specific surface area (small primary particle size), can be stably dispersed with very difficulty in an aqueous solution as fine particles.

The above-mentioned literature therefore teaches that it is desirable to use fumed silica having a specific surface area of not larger than 75 $m^2/g$ to produce a silica-dispersed solution in which silica particles are favorably dispersed.

The fumed silica having a specific surface area of not larger than 75 $m^2/g$ has an average primary particle size of as relatively large as not smaller than 36 nm as reckoned from the specific surface area that will be described later, and makes it relatively easy to obtain a silica-dispersed solution having good dispersion property. However, the fumed silica that is formed in the flame has hard particles. When the silica-dispersed solution of the fumed silica is used as a polishing slurry, therefore, the polished surfaces tend to be scarred and lose planarity, arousing a problem from the standpoint of using it as a polishing slurry for the semiconductor wafers or for the inter-layer dielectric during the IC process. In the CMP for polishing the inter-layer dielectric (often called wiring layer) as represented by a glass film in the IC process that is drawing attention in recent years, in particular, scars formed on the wiring layer are causing a breakage of the wiring formed thereon. According to the present inventors, furthermore, it has been confirmed that the supernatant liquid forms after the silica-dispersed solution is left to stand for several months; i.e., the silica-dispersed solution has poor preservation stability.

When it is attempted to prepare a silica-dispersed solution using a fumed silica having a small primary particle size and a specific surface area of not smaller than 75 $m^2/g$ by using a high-shearing mixer that has heretofore been used for the dispersion, poor dispersion stability is obtained since silica has poor dispersion property. Besides, the silica-dispersed solution becomes no longer utilizable as its viscosity increases. Even if the silica-dispersed solution having a suitable viscosity is obtained, the polishing slurry comprising such a silica-dispersed solution contains particles of various sizes made up of primary particles that are aggregated. Therefore, the polishing performance is not favorably reproduced and, besides, the polishing rate is low.

In order to improve stability of the silica-dispersed solution using the fumed silica, furthermore, Japanese Patent Publication No. 338/1993 discloses a water dispersion composition (silica-dispersed solution) of silicic anhydride obtained by dispersing, in an aqueous solvent, a silicic anhydride having a surface silanol group density of not smaller than 0.3 but not larger than 3 per 1 $nm^2$.

Though there has been described that the silica-dispersed solution has good stability, the silica-dispersed solution is obtained by drying the silica before being dispersed and treating the surfaces of the silica with an alkoxysilane coupling agent to satisfy the above-mentioned conditions, requiring cumbersome operation. Besides, the dispersion machine used for the method of producing the dispersion solution of the surface-treated silica is of the high-shearing type like the one used in the above-mentioned prior art. The silica-dispersed solution obtained by using the above dispersion machine contains aggregated particles of various sizes as described above, and still leaves much room for improvement concerning its polishing performance so that it can be used as a polishing slurry.

DISCLOSURE OF THE INVENTION

It is therefore a first object of the present invention to provide a polishing slurry comprising a silica-dispersed solution obtained by dispersing fumed silica particles in an aqueous solvent, the polishing slurry exhibiting excellent polishing performance and preservation stability.

A second object of the present invention is to provide a process for favorably producing the above-mentioned polishing slurry.

Other objects of the present invention will become obvious from the following description.

The above-mentioned objects and advantages of the present invention can be accomplished by using, as a polishing slurry, a silica-dispersed solution prepared by dispersing, in an aqueous solvent, a fumed silica having an average primary particle size which is smaller than a particular value in a manner that the silica-dispersed solution exhibits a light scattering index and an average secondary particle size that lie within particular ranges.

That is, the present invention deals with a polishing slurry comprising a silica-dispersed solution obtained by dispersing, in an aqueous solvent, a fumed silica having an average primary particle size of from 5 to 30 nm, the silica-dispersed solution exhibiting a light scattering index (n) of from 3 to 6 at a silica concentration of 1.5% by weight, and the fumed silica dispersed therein having an average secondary particle size of from 30 to 100 nm on the weight basis.

The invention further deals with a process for producing a polishing slurry by pulverizing, using a high-pressure homogenizer, a silica-dispersed solution obtained by dispersing a fumed silica in an aqueous solvent, so that the fumed silica possesses an average secondary particle size of from 30 to 100 nm on the weight basis.

In this specification, the average primary particle size of the fumed silica has a value calculated from its specific surface area in compliance with the following formula (1), $$d = 6/(s \times D)$$

where d is an average primary particle size, s is a specific surface area, and D is a density of the fumed silica (2.2 g/cm$^3$).

The light scattering index (n) is found by measuring the spectrum of the silica-dispersed solution by using a commercially available spectrophotometer. First, a reference cell and a sample cell having an optical passage length of 10 mm are filled with the deionized water to calibrate zero point over a wavelength range of from 460 to 700 nm. Next, the silica-dispersed solution is diluted with the deionized water so that the silica concentration of the silica-dispersed solution becomes 1.5% by weight. The sample cell is then filled with the silica-dispersed solution of which the concentration is adjusted to measure the absorbance ($\tau$) over a range of wavelengths ($\lambda$) of from 460 to 700 nm. Log ($\lambda$) and log ($\tau$) are plotted and, by using the following formula, $$\tau = \alpha \lambda^{-n} \qquad (2)$$

the inclination (−n) of a line is found based upon the method of least squares. In this case, n represents a light scattering index. It is desired that $\tau$ is measured at points as many as possible from the standpoint of improving the precision of n. In the present invention, measurement is taken at 241 points.

To accurately measure the absorbance, it is desired that the range of absorbance is from 0.01 to 3 by taking the sensitivity of the measuring instrument into consideration. For this purpose, therefore, the optical passage length of the cell for measuring the absorbance is set to be 10 mm, and the silica concentration in the silica-dispersed solution which is the polishing slurry is set to be 1.5% by weight, so that the absorbance can be measured over a range of nearly from 0.01 to 3. As for the range of wavelengths for measuring the absorbance, furthermore, a range of 460 to 700 nm is selected within which a straight line is formed upon plotting log ($\lambda$) and log ($\tau$), and high sensitivity is obtained. Furthermore, the average secondary particle size is measured by using a centrifugal particle size analyzer. That is, the average secondary particle size is a value found on the weight basis as measured by using the particle size analyzer.

DISCLOSURE OF THE INVENTION

Figure 1:
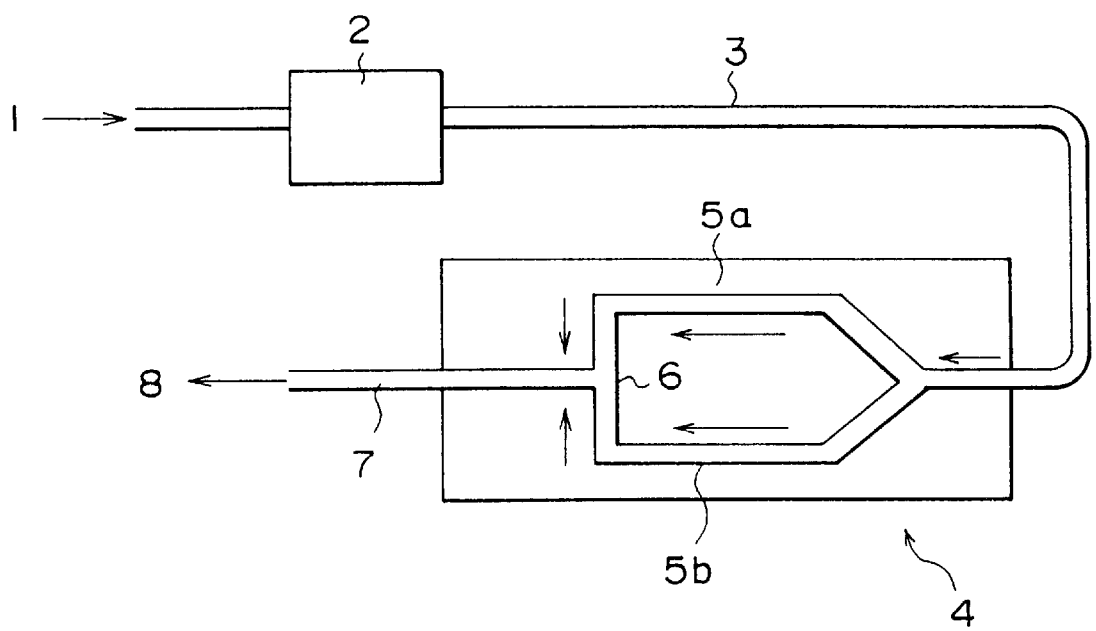
FIG. 1 is a diagram schematically illustrating the arrangement of a head-on collision jet pulverizer used in the present invention.

In the present invention, a fumed silica is used for preparing a silica-dispersed solution. The fumed silica can be obtained by a known method of burning a silica tetrachloride in the hydrogen-oxygen combustion flame. Upon changing the preparation conditions, the fumed silica has a specific surface area over a range of from about 50 to about 500 m$^2$/g. If calculated relying upon the aforementioned formula (1), the silica having specific surface area over a range of 50 to 500 m$^2$/g has an average primary particle size of from about 55 to about 5 nm.

In the polishing slurry of the present invention, it is necessary that the fumed silica has an average primary particle size of from 5 to 30 nm, preferably, from 5 to 27 nm and, more preferably, from 5 to 23 nm from the standpoint of obtaining good preservation stability and preventing the polished surfaces from being scarred.

That is, when the fumed silica having an average primary particle of larger than 30 nm is used, the obtained silica-dispersed solution exhibits good dispersion property. When left to stand for several months, however, the supernatant liquid becomes clear and precipitate deposits on the bottom of the container, exhibiting poor preservation stability. Besides, the polishing slurry using the fumed silica having such a large average primary particle size raises a problem in that the surfaces being polished tend to be scarred due to a large hardness of the fumed silica.

On the other hand, it is difficult to manufacture the fumed silica having an average primary particle size which is smaller than 5 nm.

As described above, there has been known a polishing slurry obtained by dispersing the fumed silica in an aqueous solvent. The polishing slurry that has been concretely disclosed is using the fumed silica having a specific surface area of not larger than 75 m$^2$/g (average primary particle size of not smaller than 36 nm) by taking the dispersion property into consideration. Therefore, the polishing slurry using such a fumed silica exhibits poor preservation stability and causes the polished surfaces to be scarred.

In the polishing slurry of the present invention, what is important in addition to the average primary particle size is that the silica-dispersed solution obtained by dispersing the fumed silica exhibits a light scattering index (hereinafter often referred to simply as "n") at a silica concentration of 1.5% by weight of from 3 to 6, preferably, from 3 to 5 and, more preferably, from 3.1 to 5.

That is, when the silica-dispersed solution having the value n smaller than 3 is used as the polishing slurry, the ratio of the coarsely aggregated particles increases causing the polished surfaces to be scarred and further causing the polishing rate to decrease. On the other hand, it is difficult to produce the silica-dispersed solution having an n-value which is not smaller than 6.

Therefore, the polishing slurry comprising the silica-dispersed solution satisfying the average primary particle size and having the value n of not smaller than 3, exhibits not only excellent preservation stability but also exhibits markedly improved polishing performance compared with the polishing slurry comprising the silica-dispersed solution having the value n of smaller than 3 obtained according to the conventional method by dispersing the fumed silica having the same specific surface area.

When the fumed silica is dispersed in an aqueous solvent by using a dispersing machine as represented by a homogenizer according to the conventional method of producing the silica-dispersed solution, it is difficult to obtain the silica-dispersed solution having n of not smaller than 3. In particular, the value n decreases with an increase in the primary particle size of the fumed silica that is dispersed.

In the polishing slurry of the present invention, it is important that the light scattering index (n) is not smaller than 3 and that the average secondary particle size of the fumed silica dispersed in the silica-dispersed solution is from 30 to 100 nm and, particularly, from 30 to 90 nm from the standpoint of suppressing scars on the polished surfaces and obtaining good preservation stability.

As a means for dispersing the fumed silica, the Journal of Ceramic Society of Japan 101(6) pp. 707–712 discloses a silica-dispersed solution treated by ultrasonic waves. However, the silica-dispersed solution treated by ultrasonic waves disclosed in the above literature is the one prepared in a laboratory and exhibits uniform dispersion property and good n value like that of the present invention. However, the secondary aggregated particles of the fumed silica particles are not pulverized to a sufficient degree, from which it is not possible to obtain an average secondary particle size of not larger than 100 nm. Here, the average secondary particle size found from a particle size distribution curve shown in FIG. 4 of the above literature is about 160 nm which becomes about 130 nm when measured under the same conditions as those of the present invention. The silica-dispersed solution having an average secondary particle size in excess of 100 nm causes the polished surfaces to be scarred and leaves room for improvement from the standpoint of preservation stability.

In the treatment by ultrasonic waves, furthermore, elution of a metal from an ultrasonic wave oscillator element has heretofore been pointed out, leaving further room for improvement from the standpoint of purity of the silica-dispersed solution.

The silica-dispersed solution having a degree of mono-dispersion of from 1.2 to 2 exhibits further excellent polishing characteristics as the polishing slurry.

Here, when the weights of particles are added up from those particles having small sizes, and when a particle size which accounts for 25% by weight of the total weight is denoted by $D_{25}$ and a particle size which accounts for 75% by weight of the total weight is denoted by $D_{75}$ in a particle size distribution curve prepared based on the values measured by using a centrifugal particle size analyzer, the degree of mono-dispersion stands for a value obtained by dividing $D_{75}$ by $D_{25}$, i.e., stands for $D_{75}/D_{25}$.

By adjusting the above-mentioned particular average secondary particle size and the degree of mono-dispersion to lie within the above-mentioned ranges, the fumed silica is dispersed more finely and coarsely aggregated particles are formed less, causing the surfaces of the samples after polishing to be less scarred and exhibiting polishing characteristics to provide excellent planarity.

In the present invention, water or a mixture solvent containing water is used without any limitation as an aqueous solvent that constitutes the polishing slurry. Examples of another solvent used for the mixture solvent may be polar solvents such as alcohols like methanol, ethanol and isopropanol, or ethers or ketones, which may be used in one kind or being mixed together in two or more kinds.

Generally, the polar solvent is used in an amount of not more than 10% by weight, preferably, not more than 3% by weight, and more preferably, not more than 1% by weight relative to the whole solvents.

As required, furthermore, a widely known dispersion assistant such as surfactant may be added to the aqueous solvent at a concentration of not larger than 10%, preferably, not larger than 3%, and more preferably, not larger than 1%.

According to the present invention, there is no limitation on the pH of the polishing slurry; i.e., the pH may be suitably determined depending upon the use of polishing. The silica-dispersed solution over a range of from an acidic zone to a weakly alkaline zone has such a problem that it exhibits an increased viscosity. The viscosity of the silica-dispersed solution, however, can be decreased so that it can be easily used by adding thereto a variety of salts such as sodium chloride, potassium chloride, potassium sulfate, potassium carbonate, potassium acetate, ammonium chloride, ammonium sulfate, ammonium carbonate and magnesium sulfate in addition to the surfactant which is the dispersing assistant. The salts may be used in an amount of from 10 ppm to 1% by weight with respect to the silica-dispersed solution.

Furthermore, an alkali may be added to the aqueous solvent to lower the viscosity of the silica-dispersed solution and to control the polishing rate. As the alkali, there can be used without any limitation an alkali hydroxide such as KOH, as well as an alkali that has been usually known as a composition of polishing slurry, such as ammonia, amine, tetramethylammonium hydroxide, etc. For the polishing slurry for the silicon wafers, there can be favorably used, as the alkali, an amine such as monoethanolamine, isopropylamine, ethylenediamine, propanediamine, diethanolamine, dipropylamine, dibutylamine, triethanolamine, piperazine, 2-methylpiperazine, N-methylpiperazine, bisaminopropylpiperazine, 2-aminomethylpiperidine, 2-piperidine ethanol, triethylenetetramine, aminoethylethanolamine, hexamethylenediamine, diethylenetriamine, tetramethylammonium hydroxide and tetraethylammonium hydroxide. Moreover, KOH or ammonia is preferably used as the alkali for the polishing slurry for polishing the inter-layer dielectric in the IC process.

The alkali may be added in such an amount that a desired pH is obtained. To obtain a desired pH, in general, the alkali must be added in an increased amount with an increase in the specific surface area of the fumed silica. Concretely speaking, to polish the silicon wafers or the inter-layer dielectric in the IC process, the alkali should be added in such an amount that the pH of the polishing slurry is from 8 to 13 and, particularly, from 8 to 12.

In the present invention, the silica concentration of the silica-dispersed solution may be suitably determined depending upon the use. In general, the silica concentration ranges from 0.1 to 40% by weight and, particularly, from 1 to 30% by weight. That is, as the silica concentration exceeds 40% by weight, the fluidity of the silica-dispersed solution becomes very poor making it difficult to carry out the production process. When the silica concentration is smaller than 0.1% by weight, the polishing efficiency decreases.

Therefore, the silica concentration should be adjusted to lie within the above-mentioned range. For the ultra-fine finishing of the silicon wafers, for example, use is made of a silica-dispersed solution having a silica concentration of as low as from 0.5 to 5% by weight. When the polishing slurry is to be transported, the silica concentration may often be adjusted to be not smaller than 20% by weight to decrease the cost of transportation. In this case, the polishing slurry is diluted with an aqueous solvent to a desired concentration at the time of use. The polishing slurry may be used maintaining such a high silica concentration depending upon the material to be polished, as a matter of course.

When the silicon wafers and the inter-layer dielectric are to be polished in the IC process where contamination with metal elements such as heavy metals becomes much of a problem, it is desired that the silica-dispersed solution is so prepared that the content of metal elements for adjusting the pH except potassium, is not larger than 10 ppm and, preferably, not larger than 5 ppm.

According to the present invention, though there is no particular limitation, the following process is recommended for producing the silica-dispersed solution having the above-mentioned properties.

That is, the polishing slurry obtained by dispersing a fumed silica in an aqueous solvent is pulverized by using a high-pressure homogenizer, so that the fumed silica possesses an average secondary particle size of from 30 to 100 nm on the weight basis.

Here, the pulverization is not simply to pulverize but includes the meaning of shredding the aggregate of the fumed silica as well as the meaning of dispersing the pulverized and shredded silica particles in an aqueous solvent.

In the present invention, the pulverization relying upon the high-pressure homogenizer comprises pulverizing the fumed silica by permitting the silica-dispersed solution to continuously pass through an orifice under the application of a high pressure. It is further desired that the pulverization is conducted to such a degree that the average secondary particle size is from 30 to 100 nm and, particularly, from 30 to 90 nm.

The apparatus satisfying such conditions may be the one that is capable of pulverizing the silica-dispersed solution under a pressure of from 500 to 3500 $kgf/cm^2$, preferably, from 800 to 3500 $kgf/cm^2$ and, more preferably, from 1200 to 3500 $kgf/cm^2$. This makes it possible to conduct the processing maintaining a high pulverization efficiency.

The above-mentioned high-pressure pulverization makes it possible to accomplish favorable pulverization To accomplish the pulverization more favorably, however, it is desired to provide means for head-on colliding the silica-dispersed solution that has passed through the orifice in addition to the means for passing the silica-dispersed solution under the application of a high pressure. For this purpose, in general, use is made of a commercially available apparatus called head-on collision jet pulverizer.

Referring to FIG. 1 schematically illustrating the arrangement of the head-on collision jet pulverizer used in the present invention, the silica-dispersed solution 1 which is the starting material is fed to a pump 2 and is sent, through a conduit 3, to the head-on collision jet pulverizer generally designated at 4. The silica-dispersed solution which is the starting material is divided into two streams through branched conduits 5a and 5b, brought into collision at a meeting position 6, and is drained as a product 8 through a conduit 7.

So far, the head-on collision jet pulverizer has been used for emulsifying coating materials, pigments, inks, medicine, photosensitive materials, magnetic recording medium, etc. but has never been used for dispersing the fumed silica that was attempted in the process of the present invention.

By using the head-on collision jet pulverizer, basically, the silica-dispersed solution is pressurized and is guided to the outlet side where the silica-dispersed solution is branched into two streams, the streams are narrowed as they pass through orifices to accelerate the flow speed, and the two streams are collided head-on in order to pulverize the aggregated fumed silica in the silica-dispersed solution.

By using the head-on collision jet pulverizer, the pulverization conditions cannot be definitely determined since the apparatus constant and efficiency differ depending upon the model, and the pulverizing efficiency differs depending upon the kind of the silica-dispersed solution that is used.

In general, however, the pulverization efficiency varies depending upon the processing pressure and, hence, the pulverization efficiency increases with an increase in the processing pressure.

The speed of the silica-dispersed solution at the time of head-on collision may reach, in terms of a relative speed, 50 m/sec or faster, or 100 m/sec or faster or, depending upon the cases, 150 m/sec or faster under the above-mentioned processing pressure.

The processing for head-on colliding the silica-dispersed solution by using the head-on collision jet pulverizer may be effected one time to several tens of times.

As the material constituting a portion for accelerating and colliding the silica-dispersed solution, diamond can be favorably used to suppress the wear of the material. Representative examples of such apparatus include NANOMIZER, trade name of Nanomizer Inc., MICROFLUIDIZER, trade name of Microfluidics Corp., ULTIMAIZER manufactured by Sugino Machine, Ltd., etc. The above-mentioned apparatuses are all of the continuously flowing type, and the silica-dispersed solution taken out on the outlet side is uniformly pulverized, shredded or dispersed highly uniformly unlike the silica-dispersed solutions treated batchwisely based upon ultrasonic wave dispersion or homogenizer.

Besides, the above-mentioned apparatuses perform pulverization, shredding or dispersion processing highly efficiently permitting very little impurities to infiltrate, and are adapted to quantity processing, lending themselves well for being industrially used.

In the present invention, it is desired that the concentration of the silica-dispersed solution is not larger than 40% by weight, preferably, not larger than 30% by weight, and more preferably, not larger than 20% by weight. As the concentration exceeds 40% by weight, the fluidity of the slurry becomes very poor making it difficult to accomplish the pulverization processing. The fluidity of the silica-dispersed solution decreases with a decrease in the average particle size after the pulverization or with an increase in the concentration of the silica-dispersed solution, making it difficult to carry out the processing. In such a case, the starting material slurry having a low silica concentration is treated by the process of the present invention to lower the viscosity, silica is gradually added to increase the slurry concentration, and the process of the present invention is adapted again.

In the process of the present invention, furthermore, the pH of the silica-dispersed solution at the time when it is to be collided head on is adjusted to be from 8 to 13, and more preferably, from 9 to 12, in order to obtain the silica-dispersed solution having more excellent preservation stability.

That is, according to the conventional dispersion method, the silica-dispersed solution that remains stable for extended periods of time could not be obtained despite the silica was dispersed maintaining the pH of the silica-dispersed solution to be not smaller than 8. When the process of the present invention is employed, on the other hand, the silica-dispersed solution having the pH of not smaller than 8 is not coagulated even after it is left to stand for extended periods of time or even when alkali is added thereto.

The alkalis mentioned above can be used without any limitation. The amount of the alkali cannot be definitely determined since it varies depending upon the kind of silica. Usually, the alkali may be added little by little to obtain a desired pH while observing the pH using a pH meter.

As for the silica-dispersed solution over a range of from an acidic zone to a weakly alkaline zone, the dispersed solution may exhibit an increased viscosity as described earlier. In such a case, however, the silica-dispersed solution which is the starting material exhibits a high viscosity, as a matter of course, and laborious work may be required for the dispersion processing. In such a case, various salts may be added as dispersion assistants as described earlier prior to the head-on collision, so that the silica-dispersed solution is collided head on after having acquired a decreased viscosity to facilitate the dispersion processing.

As will be understood from the foregoing description, the polishing slurry of the present invention comprises a silica-dispersed solution obtained by dispersing a fumed silica having an average primary particle size of not larger than 30 nm, so as to exhibit a light scattering index (n) of from 3 to 6 at a silica concentration of 1.5% by weight and to assume an average secondary particle size of from 30 to 100 nm on the weight basis. Therefore, the polishing slurry exhibits a high preservation stability, a large polishing rate and excellent polishing characteristics causing the polished surfaces to be scarred little. The polishing slurry can be favorably used for polishing silicon wafers and inter-layer dielectric in the IC process.

EXAMPLES

The present invention will now be concretely described by way of Examples to which only, however, the invention is in no way limited.

Silica which is the starting material and a polishing slurry comprising a silica-dispersed solution were analyzed and evaluated by the methods described below.

1. Specific surface area.

The specific surface area was measured by using a specific surface-measuring instrument of the BET type (FlowSorb II manufactured by Shimadzu Corp).

2. Average primary particle size.

The average primary particle size was calculated from the specific surface area in compliance with the formula (1) mentioned above.

3. Average secondary particle size.

The average secondary particle size was measured by using a disk type high-speed centrifugal particle size analyzer (BI-DCP manufactured by Nikkiso Co., Ltd.).

4. Preservation stability.

The number of days was examined until the polishing slurry that was left to stand still was partly gelled to lose fluidity.

5. Measurement of pH.

Measured at 25° C. by using a pH meter (F-22 manufactured by Horiba, Ltd.).

6. Measurement of viscosity.

Measured at 25° C. by using a B-type viscometer (model BL manufactured by Tokimec, Inc.). The samples exhibiting smaller than 15 mpa·s were measured by attaching an adaptor for low viscosity measurement.

7. Measurement of light scattering index (n).

Measured by using a spectrophotometer (model Ubest-35 manufactured by Japan Spectroscopic Co., Ltd.). First, a reference cell and a sample cell having an optical passage length of 10 mm were filled with the deionized water to calibrate zero point over a whole range of wavelengths. Next, the polishing slurry was diluted with the deionized water so that the silica concentration of the silica-dispersed solution became 1.5% by weight. The sample cell was then filled with the diluted solution to measure the absorbance ($\tau$) at 241 spots maintaining 1 nm over a range of wavelengths ($\lambda$) of from 460 to 700 nm. Log ($\lambda$) and log ($\tau$) were plotted and, by using the aforementioned formula (2), the inclination (−n) of a line was found based upon the method of least squares. In this case, n was regarded to be a light scattering index.

8. Polishing rate.

A 4-inch silicon wafer having a thermally grown oxide film of a thickness of about 1 $\mu$m was used as a sample of an inter-layer dielectric to be polished. The polishing device was EJ-380IN-S manufactured by Engis, Corp., and the polishing testing was conducted under the conditions of a load of 500 g/cm$^2$, rotational speed of the surface plate of 40 rpm, and a rate of feeding the polishing slurry of 80 ml/min. The polishing pad was IC1000/Suba 400 manufactured by Rodel, Inc. The polishing rate was found by measuring a change in the thickness of the $SiO_2$ film before and after the polishing by using an ellipsometer.

Furthermore, a commercially available 4-inch silicon wafer was used as a sample of a silicon wafer to be polished. The polishing device was EJ-380IN-S manufactured by Engis, Corp, and the polishing testing was conducted under the conditions of a load of 400 g/CM$^2$, rotational speed of the surface plate of 40 rpm, and a rate of feeding the polishing slurry of 80 ml/min. The polishing pad was Suba 400 manufactured by Rodel, Inc. The polishing rate was calculated from a reduction in the weight of the silicon wafer before and after the polishing. In the testing for polishing the silicon wafer, the test polishing slurry was diluted into $\frac{1}{10}$, so that the silica concentration was 1% by weight.

9. Evaluation of planarity after polishing.

The planarity of the sample after polishing was evaluated by measuring the surface Roughness (Ra) over the area of any 1×1 $\mu$m square by using an atomic force microscope (Nanoscope III manufactured by Toyo Technica Co.).

10. Contents of metal elements other than potassium.

The polishing slurry treated with mixture of HF and $HNO_3$ was examined if it contained inorganic elements by using an IPC-MS. The inorganic elements being measured were Na, Al, Ti, Cr, Fe, Co, Hi, Cu and Zn.

It was confirmed that other elements having atomic numbers larger than that of Na were contained in trace amounts that could not be detected. The lower limits for detecting the elements were not larger than 0.5 ppm for Cr, not larger than 0.4 ppm for Ni, and not larger than 0.1 ppm for other elements. Therefore, the limit for detecting the whole of the above nine elements was 1.6 ppm.

EXAMPLE 1

Into a 5-liter polyethylene container were introduced 2472 g of the deionized water and 168 g of a 1N potassium hydroxide aqueous solution, and were mixed together. Next, 360 g of a fumed silica (REOLOSIL QS-10 manufactured by Tokuyama Co. having a specific surface area of 138 $m^2/g$ and an average primary particle size of 20 nm reckoned as specific surface area) was thrown into the alkali aqueous solution and was stirred using a rod to effect pre-mixing. The thus obtained silica-dispersed solution exhibited a pH of 10.6, and was subjected to the head-on collision treatment by using a head-on collision jet pulverizer (NANOMIZER LA-31 manufactured by Nanomizer, Inc.) under a pressure of 800 $kgf/cm^2$ three times to prepare a silica-dispersed solution.

The obtained silica-dispersed solution was measured for its items as shown in Table 1. The silica-dispersed solution possessed a silica concentration of 12% by weight and was a homogeneous solution exhibiting a milk white color.

The silica-dispersed solution was used as a polishing slurry for the inter-layer dielectrics and was measured for its polishing characteristics, preservation stability, etc. The results were as shown in Table 1.

From the above results, it was learned that the polishing slurry for the inter-layer dielectric of the present invention was the silica-dispersed solution in which the fumed silica was finely dispersed, exhibiting very high stability and excellent polishing performance. Since the starting material was highly pure, the polishing slurry contained very little metal elements and, particularly, very little heavy metal elements causing very little contamination to the inter-layer dielectric.

EXAMPLES 2 AND 3

Silica-dispersed solutions were prepared in the same manner as in Example 1 but changing the pressure in the head-on collision treatment to be 500 $kgf/cm^2$ in Example 2 and to be 1100 $kgf/cm^2$ in Example 3. The silica-dispersed solutions were measured for their items as shown in Table 1. The silica-dispersed solutions were used as polishing slurries for the inter-layer dielectric to measure their polishing characteristics, preservation stability, etc. The results were as shown in Table 1. Since the starting material was highly pure, the polishing slurry contained very little metal elements and, particularly, very little heavy metal elements causing very little contamination to the inter-layer dielectric.

EXAMPLES 4 TO 7

Silica-dispersed solutions were prepared in the same manner as in Example 1 but using various kinds of fumed silica having different specific surface areas. The silica-dispersed solutions were measured for their items as shown in Table 1. The silica-dispersed solutions were used as polishing slurries for the inter-layer dielectric to measure their polishing characteristics, preservation stability, etc. The results were as shown in Table 1. Since the starting material was highly pure, the polishing slurry contained very little metal elements and, particularly, very little heavy metal elements causing very little contamination to the inter-layer dielectric.

It will be understood from the foregoing Examples that the polishing slurry comprising a silica-dispersed solution having n of not smaller than 3 exhibits excellent preservation stability and polishing rate. It will be further understood that the polishing slurry comprising a silica-dispersed solution having an average secondary particle size of 30 to 100 nm and a degree of mono-dispersion of from 1.2 to 2, makes it possible to obtain excellent planarity of the samples after polishing.

TABLE 1

| Ex. | Specific surface area (m/g) | Average primary particle size (nm) | n | Viscosity (mPa · s) | pH | Average secondary particle size (nm) | Degree of mono-dispersion | Polishing rate (nm/min) | Surface roughness (nm) | Preservation stability | Metal element concent-ratio (ppm) |
|---|---|---|---|---|---|---|---|---|---|---|---|
| 1 | 138 | 20 | 3.15 | 3.1 | 10.5 | 67 | 1.75 | 155 | 0.10 | 6 months or longer | 0.3 |
| 2 | 138 | 20 | 3.06 | 3.3 | 10.3 | 93 | 1.81 | 149 | 0.23 | 6 months or longer | 0.3 |
| 3 | 138 | 20 | 3.29 | 2.8 | 10.3 | 62 | 1.52 | 166 | 0.09 | 6 months or longer | 0.3 |
| 4 | 205 | 13 | 3.25 | 3.0 | 10.5 | 71 | 1.60 | 142 | 0.12 | 6 months or longer | 1.4 |
| 5 | 300 | 9 | 3.32 | 3.2 | 10.1 | 56 | 1.56 | 113 | 0.09 | 6 months or longer | 1.4 |
| 6 | 380 | 7 | 3.39 | 3.2 | 10.4 | 52 | 1.49 | 106 | 0.08 | 6 months or longer | 1.5 |
| 7 | 105 | 26 | 3.02 | 2.6 | 10.3 | 113 | 1.91 | 170 | 0.25 | 6 months or longer | 0.3 |

Ex.: Example

COMPARATIVE EXAMPLE 1

A silica-dispersed solution was prepared in the same manner as in Example 1 but using a homogenizer (ULTRATURRAX T-25 manufactured by Ika Works, Inc.) as a pulverizer. The silica-dispersed solution was measured for its items as shown in Table 2. The results were as shown in Table 2. The silica-dispersed solution was used as a polishing slurry for the inter-layer dielectric to measure its polishing characteristics, preservation stability, etc. The results were as shown in Table 2.

The amount of the dispersed solution that was treated was one-third that of Example 1, and the treating time was 30 minutes.

The polishing slurry comprising the silica-dispersed solution obtained by this process exhibited n of 2.77, and in which the silica was dispersed poorly compared to that of Example 1. Therefore, the preservation stability was poorer than that of Examples, and the polishing rate was small. Moreover, the surface roughness of the sample after polishing was 0.33 nm which was inferior to that of Examples.

It will be understood from the above results that the process of the present invention makes it possible to finely disperse the fumed silica compared with that of the prior art and, hence, the polishing slurry obtained according to the present invention exhibits excellent preservation stability and polishing characteristics.

COMPARATIVE EXAMPLES 2 TO 6

Silica-dispersed solutions were prepared according to the process of Comparative Example 1 but using various kinds of fumed silica having different average primary particle sizes (specific surface areas) as shown in Table 2. The thus obtained silica-dispersed solutions were measured for their items as shown in Table 2. Moreover, the silica-dispersed solutions were used as polishing slurries for the inter-layer dielectric to measure their polishing characteristics, preservation stability, etc. The results were as shown in Table 2.

As will be understood from the above results, n approaches 3 as the specific surface area decreases but cannot exceed 3. In Comparative Examples 3 and 4, the fumed silica possessed such a large specific surface area that a stable silica-dispersed solution could not be prepared by the conventional process. Therefore, some of the testing items were not conducted.

ing was conducted by using the silica-dispersed solution that was diluted with pure water such that the silica concentration was 1% by weight. The results were as shown in Table 3.

From the above results, it was learned that the polishing slurry for the silicon wafers of the present invention was the silica-dispersed solution in which the fumed silica was finely dispersed, exhibiting very high stability and excellent polishing characteristics. Since the starting material was highly pure, the polishing slurry contained very little metal elements and, particularly, very little heavy metal elements causing very little contamination to the silicon wafers.

EXAMPLES 9 AND 10

Silica-dispersed solutions were prepared in the same manner as in Example 8 but using various kinds of fumed silica having different specific surface areas. The silica-dispersed solutions were measured for their items as shown in Table 3. The silica-dispersed solutions were used as polishing slurries for the silicon wafers to measure their polishing characteristics, preservation stability, etc. The results were as shown in Table 3. Since the starting material was highly pure, the polishing slurry contained very little metal elements and, particularly, very little heavy metal elements causing very little contamination to the silicon wafers.

It will be understood from the foregoing Examples that the polishing slurry comprising a silica-dispersed solution having n of not smaller than 3 exhibits excellent preserva-

TABLE 2

| Comp. Ex. | Specific surface area (m/g) | Average primary particle size (nm) | n | Viscosity (mPa · s) | pH | Average secondary particle size (nm) | Degree of mono-dispersion | Polishing rate (nm/min) | Surface roughness (nm) | Preservation stability | Metal element concent-ratio (ppm) |
|---|---|---|---|---|---|---|---|---|---|---|---|
| 1 | 138 | 20 | 2.77 | 12.6 | 10.5 | 178 | 2.48 | 89 | 0.33 | 4 months | 1.4 |
| 2 | 205 | 13 | 2.71 | 18.6 | 10.5 | 192 | 2.60 | 122 | 0.27 | 3 months | 1.1 |
| 3 | 300 | 9 | 2.05 | 42.7 | 10.2 | 202 | 2.98 | * | * | 1 month | 1.5 |
| 4 | 380 | 7 | 1.73 | * | 10.4 | 216 | 3.30 | * | * | 1 month | 1.7 |
| 5 | 105 | 26 | 2.90 | 4.6 | 10.2 | 129 | 1.99 | 147 | 0.37 | 5 months | 2.3 |
| 6 | 80 | 34 | 2.61 | 3.2 | 10.4 | 141 | 2.08 | 126 | 0.44 | 2 months | 2.8 |

Comp. Ex.: Comparative Example

EXAMPLE 8

Into a 5-liter polyethylene container were introduced 2550 g of deionized water and 150 g of piperazine, and were mixed together. Next, 300 g of a fumed silica (REOLOSIL QS-10 manufactured by Tokuyama Co. having a specific surface area of 138 m²/g and an average primary particle size of 20 nm reckoned as specific surface area) was thrown into the alkali aqueous solution and was stirred using a rod to effect pre-mixing. The thus obtained silica-dispersed solution exhibited a pH of 11.2, and was subjected to the head-on collision treatment by using a head-on collision jet pulverizer (NANOMIZER LA-31 manufactured by Nanomizer, Inc.) under a pressure of 800 kgf/cm² three times to prepare a silica-dispersed solution.

The obtained silica-dispersed solution was measured for its items as shown in Table 3. The silica-dispersed solution possessed a silica concentration of 10% by weight and was a homogeneous solution exhibiting a milk white color.

The silica-dispersed solution was used as a polishing slurry for the silicon wafers, and was measured for its properties and polishing characteristics. The polishing testtion stability and polishing rate. It will be further understood that the polishing slurry comprising a silica-dispersed solution having an average particle size of 30 to 100 nm and a degree of mono-dispersion of from 1.2 to 2, makes it possible to obtain excellent planarity of the samples after polishing.

COMPARATIVE EXAMPLES 7 TO 9

Silica-dispersed solutions were prepared in the same manner as in Examples 8 to 10 but using a homogenizer (ULTRATURRAX T-25 manufactured by Ika Works, Inc.) as a pulverizer. The silica-dispersed solutions were measured for their items as shown in Table 3. The results were as shown in Table 3. The silica-dispersed solutions were used as polishing slurries for the inter-layer dielectric to measure their polishing characteristics, preservation stability, etc. The results were as shown in Table 3.

The amount of the dispersed solution that was treated was one-third that of Example 8, and the treating time was 30 minutes.

According to this process, n was smaller than 3, and the silica was dispersed poorly compared to that of Examples 8 to 10. Therefore, the preservation stability was poorer than that of Examples, and the polishing rate was small. Moreover, the surface coarseness of the samples after polishing was inferior to that of Examples.

It will be understood from the above results that the process of the present invention makes it possible to finely disperse the fumed silica compared with that of Comparative Examples and, hence, the polishing slurry obtained according to the present invention exhibits excellent preservation stability and polishing characteristics.

pulverizer (SONICATOR, model M15, manufactured by Taikan Seisakusho Co.) and treating the solution with a power of 150 W for 10 minutes. The amount of treatment at one time was about 50 ml, and the silica-dispersed solution of a required amount was obtained by repeating the treatment several tens of times.

Table 4 shows the measured items of the silica-dispersed solutions and properties of when the silica-dispersed solutions were used as polishing slurries for the inter-layer dielectric.

TABLE 3

| | Specific surface area (m/g) | Average primary particle size (nm) | n | Viscosity (mPa · s) | pH | Average secondary particle size (nm) | Degree of mono-dispersion | Polishing rate (nm/min) | Surface roughness (nm) | Preservation stability | Metal element concent-ratio (ppm) |
|---|---|---|---|---|---|---|---|---|---|---|---|
| Ex. 8 | 138 | 20 | 3.17 | 3.1 | 11.2 | 80 | 1.71 | 455 | 0.13 | 6 months or longer | detection impossible |
| Ex. 9 | 205 | 13 | 3.33 | 3.3 | 11.2 | 68 | 1.66 | 441 | 0.10 | 6 months or longer | detection impossible |
| Ex. 10 | 380 | 7 | 3.60 | 3.2 | 11.1 | 62 | 1.53 | 420 | 0.09 | 6 months or longer | detection impossible |
| C.E. 7 | 138 | 20 | 2.80 | 11.8 | 11.3 | 151 | 2.21 | 386 | 0.41 | 2 months | 1.5 |
| C.E. 8 | 205 | 13 | 2.75 | 17.2 | 11.2 | 186 | 2.56 | 373 | 0.32 | 1 month | 1.2 |
| C.E. 9 | 380 | 7 | 1.51 | * | 11.3 | 206 | 2.88 | 290 | 0.33 | 1 month | 1.7 |

Ex.: Example, C.E.: Comparative Example

COMPARATIVE EXAMPLE 10

A silica-dispersed solution was obtained by using colloidal silica (SNOWTEX 20L manufactured by Nissan Kagaku Kogyo Co.) obtained from sodium silicate as a starting material, and from which impurity ions were removed as much as possible by ion exchange. The silica-dispersed solution was diluted with pure water so that the silica concentration was 12% by weight, and potassium hydroxide was added little by little so as to exhibit a pH of 10.3.

The thus obtained silica-dispersed solution exhibited an average primary particle size of 46 nm, an n-value of 3.92, a viscosity of 2.2 mPa·s, a pH of 10.3, an average secondary particle size of 57 nm, and a degree of mono-dispersion of 1.33. When used as a slurry for the inter-layer dielectric, the silica-dispersed solution exhibited polishing characteristics and preservation stability that were nearly comparable to those of the polishing slurry of the present invention.

However, the silica-dispersed solution contained metal elements in amounts of 750 ppm indicating that the purity was considerably lower than that of the Examples.

The sample after polished was washed, the oxide film on the surface of the sample was dissolved with hydrofluoric acid, and the solution was subjected to the analysis using the above-mentioned ICP-MS. As a result, the total of the above-mentioned nine metal elements could be reckoned to be $7.2 \times 10^{13}$ atoms/cm$^2$ per the surface area of the sample wafer.

The sample tested in Example 3 was also analyzed in regard to its contaminating metals to be $3.8 \times 10^{11}$ atoms/cm$^2$. It will thus be understood that the polishing slurry having high purity of the present invention makes it possible to decrease the contamination by metals on the polished surfaces.

COMPARATIVE EXAMPLES 11 AND 12

Silica-dispersed solutions were prepared in the same manner as in Examples 4 and 6 but using an ultrasonic Though the n-value was not smaller than 3, the average secondary particle size was not smaller than 100 nm. Therefore, the silica-dispersed solutions exhibited inferior performance such as polishing rate, surface coarseness, preservation stability, etc.

Moreover, the metal element concentrations were slightly larger than those of Examples probably due to the corrosion of a stainless steel of the ultrasonic wave irradiation device.

TABLE 4

| | Comp. Ex. 11 | Comp. Ex. 12 |
|---|---|---|
| Specific surface area (m$^2$/g) | 205 | 380 |
| Ave. primary particle size (nm) | 13 | 7 |
| n | 3.07 | 3.28 |
| Viscosity (mPa · s) | 3.2 | 4.3 |
| pH | 10.5 | 10.4 |
| Ave. secondary particle size (nm) | 128 | 112 |
| Degree of mono-dispersion | 1.84 | 1.96 |
| Polishing rate (nm/min) | 132 | 98 |
| Surface coarseness (nm) | 0.22 | 0.18 |
| Preservation stability | 5 months | 3 months |
| Metal elements (ppm) | 7.9 | 5.3 |

We claim:

1. A polishing slurry comprising a silica-dispersed solution obtained by dispersing, in an aqueous solvent, a fumed silica having an average primary particle size of from 5 to 30 nm, a light scattering index (n) of the silica-dispersed solution measured at 1.5% by weight of the silica concentration thereof is from 3 to 6, the fumed silica dispersed therein having a weight average secondary particle size of from 30 to 100 nm and the degree of mono-dispersion of the fumed silica in the silica-dispersed solution is from 1.2 to 2.0.

2. A polishing slurry consisting essentially of a silica-dispersed solution obtained by dispersing, in an aqueous solvent, a fumed silica having an average primary particle size of from 5 to 30 nm, wherein the fumed silica dispersed therein has a weight average secondary particle size of from 30 to 100 nm, and the degree of mono-dispersion of the fumed silica in the silica-dispersed solution is from 1.2 to 2.

3. A polishing slurry according to claim 2, wherein the concentration of fumed silica in the silica-dispersed solution is from 1 to 30% by weight, and the pH of the silica-dispersed solution is from 8 to 13.

4. A polishing slurry according to claim 2, wherein a light scattering index (n) of the silica-dispersed solution measured at 1.5% by weight of the silica concentration thereof is from 3 to 6.

5. A polishing slurry consisting essentially of a silica-dispersed solution obtained by dispersing, in an aqueous solvent, a fumed silica having an average primary particle size of from 5 to 30 nm, wherein the fumed silica dispersed therein has a weight average secondary particle size of from 30 to 100 nm, the degree of mono-dispersion of the fumed silica in the silica-dispersed solution is from 1.2 to 2, the concentration of fumed silica in the silica-dispersed solution is from 1 to 30% by weight, and the pH of the silica-dispersed solution is from 8 to 13.

6. A method of polishing a material comprising polishing said material with a polishing slurry, wherein the polishing slurry comprises a silica-dispersed solution obtained by dispersing a fumed silica having an average primary particle size of 5 to 30 nm in an aqueous solvent, wherein the fumed silica dispersed therein has a weight average secondary particle size of from 30 to 100 nm, and the degree of mono-dispersion of the fumed silica in the silica-dispersed solution is from 1.2 to 2.

7. A method according to claim 6, wherein the material to be polished is a semiconductor wafer.

8. A method according to claim 6, wherein the material to be polished is an inter-layer dielectric in a process for the production of integrated circuits.

9. A method of polishing a material comprising polishing said material with a polishing slurry, wherein the polishing slurry consists essentially of silica-dispersed solution obtained by dispersing a fumed silica having an average primary particle size of 5 to 30 nm in an aqueous solvent wherein the fumed silica dispersed therein has a weight average secondary particle size of from 30 to 100 nm, and the degree of mono-dispersion of the fumed silica in the silica-dispersed solution is from 1.2 to 2.

10. A method according to claim 9, wherein a light scattering index (n) of the silica-dispersed solution measured at 1.5% by weight of the silica concentration thereof is from 3 to 6.

11. A method according to claim 9, wherein the material to be polished is a semiconductor wafer, and the polished surface has a surface roughness of Ra 0.08 to 0.25.

12. A method according to claim 9, wherein the material to be polished is an inter-layer dielectric in a process for the production of integrated circuits, and the polished surface has a surface roughness of Ra 0.08 to 0.25.

* * * * *